United States Patent [19]
Lanius

[11] Patent Number: 5,189,823
[45] Date of Patent: Mar. 2, 1993

[54] DECOY INCLUDING BODY POSITIONABLE IN ALTERNATIVE POSITIONS

[75] Inventor: Charles A. Lanius, Prairie du Sac, Wis.

[73] Assignee: Flambeau Products Corporation, Middlefield, Ohio

[21] Appl. No.: 692,117

[22] Filed: Apr. 26, 1991

[51] Int. Cl.$^5$ ............................................. A01M 31/06
[52] U.S. Cl. ............................................................ 43/3
[58] Field of Search ........................................ 43/2, 3

[56] References Cited

U.S. PATENT DOCUMENTS

| | | | |
|---|---|---|---|
| 2,535,445 | 12/1950 | Miller et al. | 43/3 |
| 2,787,074 | 4/1957 | Miller | 43/3 |
| 2,816,384 | 12/1957 | Rexius | 43/3 |
| 4,435,913 | 3/1984 | Messina | 43/3 |
| 4,651,458 | 3/1987 | Lanius | 43/3 |
| 4,658,530 | 4/1987 | Ladehoff | 43/3 |
| 4,845,872 | 7/1987 | Anderson | 43/3 |
| 4,885,861 | 12/1989 | Gazalski | 43/3 |

FOREIGN PATENT DOCUMENTS 193738 3/1923 United Kingdom .

Primary Examiner—Kurt Rowan

[57] ABSTRACT

A decoy including a decoy body and a leg assembly supporting the decoy body above the ground and for selective shiftable movement between a first decoy position and a second decoy position. The leg assembly includes a pair of legs connected to and supporting the decoy body, at least one leg having an upper end engaging the decoy body such that the decoy body is releasably selectively shiftable with respect to the leg assembly between the first decoy position and the second decoy position.

13 Claims, 2 Drawing Sheets

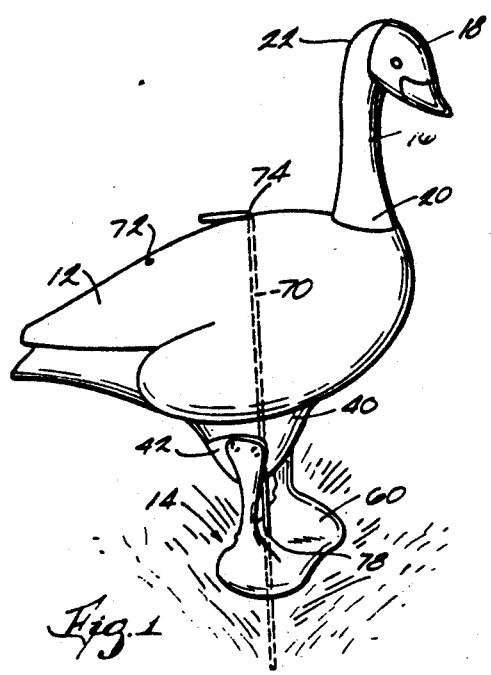
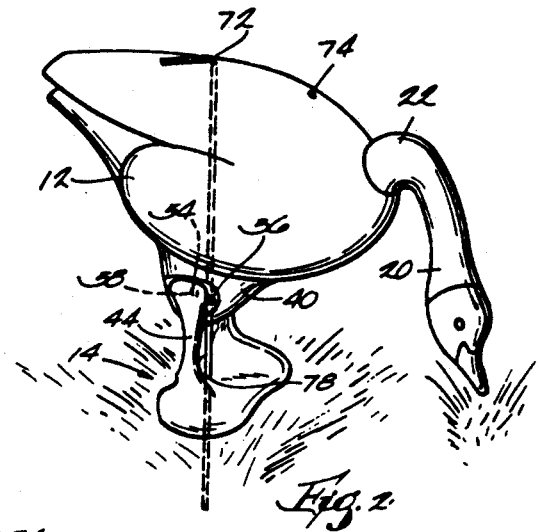
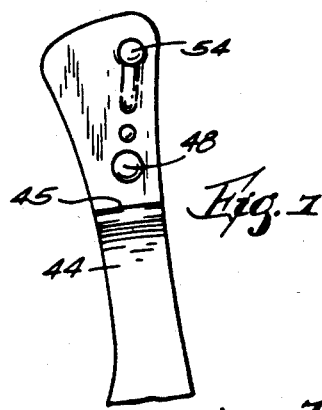
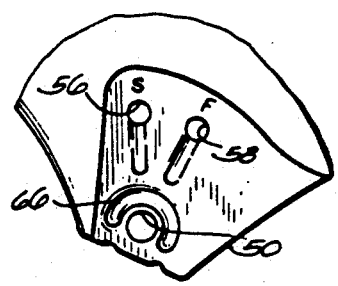
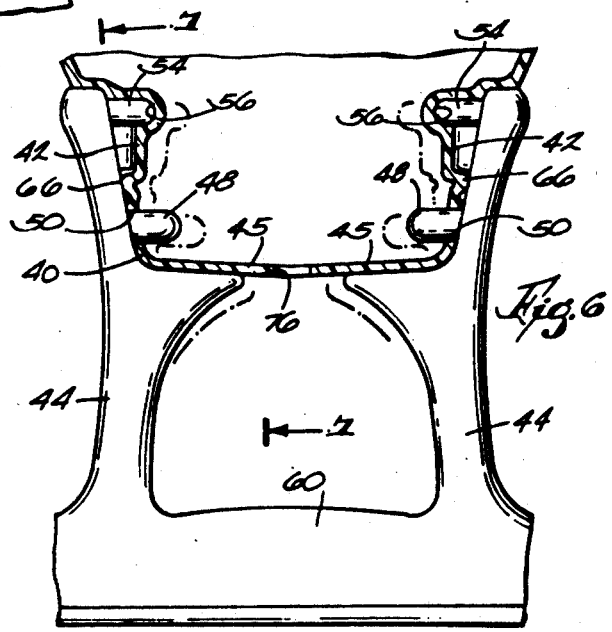

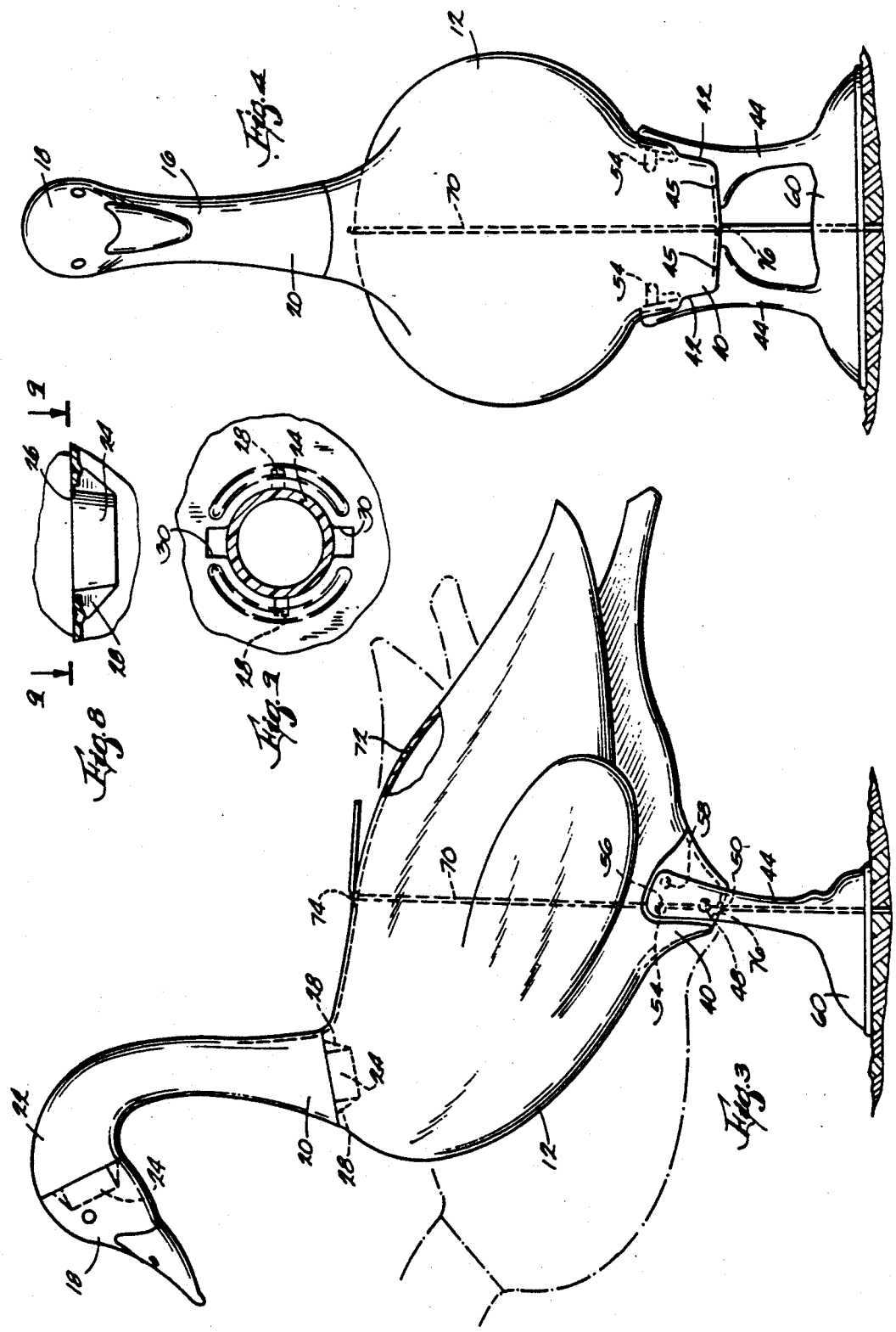

DECOY INCLUDING BODY POSITIONABLE IN ALTERNATIVE POSITIONS

FIELD OF THE INVENTION

The invention relates to decoys and more particularly to decoys which can be moved or adjusted to simulate a bird in alternative positions.

BACKGROUND PRIOR ART

A goose decoy is illustrated in applicant's U.S. Pat. No. 4,651,458. The goose decoy illustrated in that patent includes a decoy body adapted to rest on the ground in a position simulating a sitting goose. The decoy is also provided with a neck and head assembly wherein the neck can be reversed end for end to simulate a goose in either a feeding position or alternatively a sentry position.

Attention is also directed to U.S. Pat. No. 4,845,872 illustrating a goose decoy pivotably joined to a supporting stake.

U.S. Pat. No. 4,885,861 illustrates a molded goose decoy having a removable leg assembly supporting the decoy body.

Other decoy configurations are illustrated in U.S. Pats. No. 193,738; 2,816,384; 2,535,445 and 4,658,530.

SUMMARY OF THE INVENTION

The present invention is directed to a decoy having a body supported in a simulated standing position by a leg assembly including a pair of legs, the body and legs constructed such that the body is adjustably pivotably movable between a first position wherein the goose body is in a simulated sentry position and a second position wherein the goose body is in a simulated feeding position. The decoy further includes a head and neck assembly which can be shifted between a first position wherein the neck is in a sentry position and a second or feeder position. The legs supporting the decoy body engage a lower portion of the body, and the legs and body include complementary pairs of projections and cooperating recesses or apertures for housing the projections, the apertures and projections permitting the body to be selectively held in position with respect to the legs.

In one embodiment of the invention, the leg assembly includes a base and a pair of legs integrally joined to the base such that the legs resiliently grip the body.

In one embodiment of the invention, the body includes a first aperture adapted to house a projection extending from one of the legs when the decoy body is in a sentry position and a second aperture spaced from the first aperture and intended to house the projection when the decoy is in the feeding position.

Various other features and advantages of the invention will be apparent from the following description of the preferred embodiment, from the drawings and from the claims.

BRIEF DESCRIPTION OF THE DRAWINGS

FIG. 1 is an illustration of a goose decoy embodying the invention and showing the goose decoy in a sentry position.

FIG. 2 is an illustration of a goose decoy shown in FIG. 1 and in a second or feeder position.

FIG. 3 is an enlarged view of the goose decoy shown in FIG. 1.

FIG. 4 is an end elevation view of the goose decoy shown in FIG. 3.

FIG. 5 is an enlarged partial view of the goose decoy shown in FIG. 3 and with a portion of the decoy leg removed.

FIG. 6 is an enlarged partial view of the goose decoy shown in FIG. 4 and with portions cut away.

FIG. 7 is a cross section view taken along line 7—7 in FIG. 6.

FIG. 8 is an enlarged cross section view of a portion of the decoy shown in FIG. 3.

FIG. 9 is a cross section view taken along line 9—9 in FIG. 8.

Before describing a preferred embodiment of the invention it is to be understood that the invention is not limited in its application to the details of construction and to the arrangement of components set forth in the following description or illustrated in the drawings. The invention is capable of other embodiments and of being practiced and carried out in various ways. Also, it is to be understood that the phraseology and terminology used herein is for the purpose of description and should not be regarded as limiting.

DESCRIPTION OF THE PREFERRED EMBODIMENT

FIG. 1 illustrates a goose decoy 10 embodying the present invention and including a decoy body 12 supported by a leg assembly 14 for movement between a first position shown in FIG. 1 and a second position shown in FIG. 2. The FIG. 1 position of the goose decoy 10 is intended to simulate a goose in a sentry position and the FIG. 2 position is intended to simulate a goose in a feeding position. While the body of the decoy could be constructed in other ways, in the illustrated arrangement the decoy body has a hollow molded plastic construction and can be formed by a blow molding operation. The goose decoy 10 also includes a removably attached neck 16 and a removably attached head 18, the neck and head shown in greater detail in FIG. 3. More specifically, the neck is reversible end for end such that the opposite ends of the neck 20 and 22 can be alternatively attached to the body 12 of the goose decoy and both of the opposite ends 20 and 22 can alternatively support the head 18 of the decoy in the same manner as illustrated in applicant's prior U.S. Pat. No. 4,651,458. The disclosure of that patent is incorporated herein by reference insofar as it illustrates a head and neck assembly removably attached to a decoy body, and with the neck being reversible end for end to simulate a goose in a sentry position and a feeding position.

Referring more particularly to the neck removably attachable to the decoy body 12 and supporting the head 18 in alternative positions, the opposite ends 20 and 22 of the neck 16 each include a central projection 24 adapted to extend into a generally circular hole or aperture 26 provided in the top of the decoy body 12. The central projection 24 includes a pair of flanges 28 positioned on diametrically opposite sides of the central projection 24 and adapted to extend through a pair of notches 30 (FIG. 9) provided at the opposite side of the aperture 26. The central projection 24 and integrally joined flanges 28 can be inserted into the aperture 26 and notches 30 in the top of a decoy body, and the neck can then be rotated about the axis of the central projection 24 such that the neck is secured in place in a bayonet mount type of attachment to the body. The opposite end of the neck also includes a central projection 24 and flanges 28 identical to those on the other end of the neck so that either end of the neck can be housed in the aperture in the upper end of the body in an identical manner. The decoy head 18 includes an aperture having the same size and shape as aperture 26 provided in the top of the decoy body and so as to receive the central projection of the end of the neck in the same manner as the central projection of the opposite end of the neck is housed in the aperture provided in the decoy body.

Means are also provided for alternately supporting the decoy body 12 in a first or sentry position and in a second or feeding position, the means for supporting the decoy body including the leg assembly 14 engaging the bottom portion of the decoy body. More particularly, in the illustrated arrangement the decoy body includes a lower projection 40 including opposite side surfaces 42. The leg assembly 14 includes a pair of spaced apart legs 44 adapted to engage the lower portion 40 of the body, the legs 44 each including upper ends having a first projection or pin 48 adapted to extend into a complementary aperture 50 provided in the side 42 of the lower portion 40 of the decoy body.

In the illustrated arrangement each leg 44 also includes a second projection or pin 54 spaced above the first pin 48 and adapted to be housed in one of a pair of apertures 56 and 58 provided in the side surfaces of the lower portion of the decoy body. The apertures 56 and 58 are mutually spaced apart such that when the second pin is housed in a first one of the apertures 56, illustrated in FIG. 5 with the letter "S", the body of the decoy will be supported in the sentry position (FIG. 3) and when the second pin is housed in the aperture 58 identified with the letter "F", the decoy body 12 will be positioned in the feeding position (FIG. 2).

It should be understood that while in the illustrated arrangement the projections 48 and 54 are integrally joined to the legs, and the apertures 50, 56 and 58 are provided in the decoy body, in other arrangements the projections could be supported by the decoy body and the corresponding apertures could be provided in the legs.

In the illustrated construction the leg assembly 14 further includes a base 60 integrally joined to the legs 44 and supporting the legs such that the upper ends of the legs will resiliently engage the lower portions of the decoy body. More specifically, in the preferred embodiment of the invention the base 60 and legs 44 are molded from resilient plastic material and comprise integrally joined elements, the plastic material being sufficiently resilient that the upper ends of the legs 44 resiliently grip or engage the opposite sides of the lower portion of the decoy body and the resilient gripping force of the legs 44 releasably maintains the pins 48 and 54 projecting from the legs in engagement with the apertures provided in the lower portion 40 of the decoy body. The decoy body 12 can be shifted between the sentry and feeding positions by pulling the upper ends of the legs outwardly away from the decoy body, repositioning the decoy body, and then allowing the legs to resiliently grip the decoy body with the lower pin or projection 48 housed in the aperture 50 and the projection 54 housed in the alternate aperture 56 or 58.

In the specific arrangement illustrated in the drawings and particularly in FIGS. 5 and 6, the opposite sides 42 of the lower portion 40 of the decoy body include molded generally circular ribs 66 surrounding the aperture 50 and intended to provide increased stiffness to the material surrounding the aperture.

In the construction illustrated in the drawings each of the legs 44 also includes a ledge or shoulder 45 adapted to be positioned beneath portions of the lower portion 40 of the decoy body to provide further support for the decoy body.

In the illustrated arrangement means are also provided for supporting the decoy 10 on the ground in an upright position and to prevent tipping of the decoy. In the illustrated arrangement the means for supporting the decoy includes a metal rod 70 which can be inserted downwardly through aligned holes provided in the decoy and into the ground. More particularly, the decoy body is provided with a pair of spaced apart holes 72 and 74 formed in the upper or back portion of the decoy body. A complementary hole 76 (FIG. 6) is provided in the bottom of the decoy, and a third hole 78 is provided in the base of the leg assembly. As shown in FIG. 1, when the decoy is positioned in the sentry position, the holes 74, 76 and 78 are in vertical alignment and the elongated metal rod 70 can extend downwardly through those holes into the ground. Alternatively, when the decoy is in the feeding position, the elongated metal rod can extend downwardly through holes 72, 76 and 78 into the ground. p Various features of the invention are set forth in the following claims.

I claim:

1. A decoy comprising:

a decoy body having opposite sides and one of a projection and a pair of spaced apart apertures on one of the opposite sides, and a leg assembly supporting the decoy body above the ground and for selective shiftable movement between a first decoy position and a second decoy position, the leg assembly including a pair of legs releaseably engaging the opposite sides of the decoy body, one of the legs including the other of the projection and the pair of spaced apart apertures, the projection being housed in one of the apertures when the decoy body is in the first decoy position and the projection being housed in the other of the apertures when the decoy body is in the second decoy position, and means for attaching at least one of the legs to the decoy body such that the decoy body is releaseably selectively shiftable with respect to the leg assembly between the first decoy position and the second decoy position.

2. A decoy as set forth in claim 1 wherein the leg assembly includes means for causing the pair of legs to releasably grip the opposite sides of the decoy body.

3. A decoy as set forth in claim 1 and further including a decoy head and a neck having opposite ends, one end of the neck being connected to the body when the body is pivoted to the first decoy position with respect to the legs, an opposite end of the neck supporting the decoy head, and the opposite end of the neck being connected to the body when the body is pivoted with respect to the legs to the second decoy position, said one end of the neck supporting the head when the decoy is in the second decoy position.

4. A decoy as set forth in claim 1 wherein the means for attaching includes a third aperture in one of the legs and the decoy body and a second projection on the other of the one leg and the decoy body, the second projection being housed in the third aperture to support the decoy body for pivotal movement between the first and second decoy positions.

5. A decoy as set forth in claim 1 wherein the decoy body includes opposite sides, each of an opposite sides including a pair of spaced apart apertures, wherein each of the legs includes a projection, and wherein each of the projections is housed in a first one of the apertures on one of the opposite sides when the decoy body is in the first decoy position and each of the projections is housed in a second one of the apertures on one of the opposite sides when the decoy body is in the second decoy position.

6. A decoy as set forth in claim 1 wherein the decoy body includes a lower portion having the opposite sides, each of the opposite sides including first, second and third apertures, wherein each of the legs includes an upper end engageable with one of the opposite sides and including first and second projections, and wherein each of the first projections is releaseably housed in one of the third apertures to support the decoy body for shifting movement between the first decoy position and the second decoy position, and each of the second projections is housed in one of the first apertures when the decoy body is in the first decoy position and is housed in one of the second apertures when the decoy body is in the second decoy position.

7. A decoy comprising:
a decoy body including a lower portion having opposite sides and a pair of spaced apart apertures on one of the opposite sides, and
a leg assembly supporting the decoy body above the ground and for selective shiftable movement between a first decoy position and a second decoy position, the leg assembly including a pair of legs connected to and supporting the decoy body, at least one leg having an upper end adapted to engage the decoy body, the at least one leg including a projection, the projection being housed in one of the apertures when the decoy is in the first decoy position and the projection being housed in the second one of the apertures when the decoy body is in the second decoy position, and means for attaching the upper end of one of the legs to the decoy body such that the decoy body is releaseably selectively shiftable with respect to the leg assembly between the first decoy position and the second decoy position.

8. A decoy as set forth in claim 7 wherein the lower portion of the body includes a third aperture spaced from the pair of apertures and wherein the leg assembly includes a second projection housed in the third aperture when the body is in the first decoy position and the second decoy position.

9. A decoy comprising:
a decoy body having opposite sides including a plurality of recesses, and
a leg assembly supporting the decoy body above the ground and for selective shiftable movement between a first decoy position and a second decoy position, the leg assembly including a pair of legs connected to and supporting the decoy body, each of the legs including upper ends adapted to engage the decoy body and a pair of spaced apart projections projecting inwardly toward the opposite sides of the decoy body, the projections being housed in a first pair of recesses in the decoy body when the decoy body is supported in the first decoy position and the projections being housed in a second pair of recesses when the decoy body is supported in the second decoy position.

10. A decoy as set forth in claim 9 wherein the legs further include a support surface positioned beneath the decoy body and supporting the body.

11. A decoy comprising:
a decoy body having opposite sides, and
a leg assembly supporting the decoy body above the ground and for selective shiftable movement between a first decoy position and a second decoy position, the leg assembly including a base, a pair of legs connected to and supporting the decoy body, the legs being fixed to the base such that the legs project upwardly from the base, and the legs including upper ends, the upper ends of the legs resiliently gripping the decoy body, and means for attaching the upper end of at least one of the legs to the decoy body such that the decoy body is releaseably selectively shiftable with respect to the leg assembly between the first decoy position and the second decoy position.

12. A decoy as set forth in claim 11 wherein the legs are integrally joined to the base and the base and the legs are comprised of resilient material such that the legs resiliently grip the opposite sides of the decoy body.

13. A decoy comprising:
a decoy body including a lower portion having opposite sides, each of the opposite sides of the lower portion including a plurality of spaced apart apertures, and
a leg assembly supporting the decoy body above the ground and for selective shiftable movement between a first decoy position and a second decoy position, the leg assembly including a pair of legs connected to and supporting the decoy body, at least one of the legs including an upper end adapted to engage the lower portion of the decoy body, said upper end including a pair of spaced apart projections adapted to be housed in a first pair of spaced apart apertures on one of the opposite sides to support the decoy body in the first decoy position and the pair of spaced apart projections being adapted to be housed in a second pair of spaced apart apertures on one of the opposite sides to support the decoy body in the second decoy position, and means for attaching the upper end of one of the legs to the decoy body such that the decoy body is releaseably selectively shiftable with respect to the leg assembly between the first decoy position and the second decoy position.

* * * * *